United States Patent
Wang

(10) Patent No.: US 8,736,350 B2
(45) Date of Patent: May 27, 2014

(54) PRESSURE ENABLING DEVICE AND METHOD AND ELECTRONIC APPARATUS CONTAINING THE SAME

(75) Inventor: Chang-Tao Wang, Nanchang (CN)

(73) Assignees: Inventec Appliances (Shanghai) Corporation, Shanghai (CN); Inventec Appliances Corp., Taipei (TW); Inventec Appliances (Nanchang) Corporation, Nanchang (CN)

( * ) Notice: Subject to any disclaimer, the term of this patent is extended or adjusted under 35 U.S.C. 154(b) by 741 days.

(21) Appl. No.: 12/948,765

(22) Filed: Nov. 18, 2010

(65) Prior Publication Data

US 2011/0115547 A1 May 19, 2011

(30) Foreign Application Priority Data

Nov. 18, 2009 (CN) .......................... 2009 1 0186503

(51) Int. Cl.
*H03K 17/96* (2006.01)
(52) U.S. Cl.
USPC .......................................... 327/517; 327/516
(58) Field of Classification Search
USPC .................................. 327/516, 517
See application file for complete search history.

(56) References Cited

U.S. PATENT DOCUMENTS 4,611,129 A * 9/1986 Ishihara .......................... 327/516
6,604,423 B1 * 8/2003 Irokawa et al. .................. 73/714

* cited by examiner

*Primary Examiner* — Hai L Nguyen
(74) *Attorney, Agent, or Firm* — CKC & Partners Co., Ltd.

(57) ABSTRACT

A pressure enabling apparatus includes: a pressure sensor, a resistance wire and a pressure setting module, wherein a terminal of the resistance wire is connected to the pressure sensor and another terminal thereof is connected to an electronic apparatus. The pressure setting module is provided for receiving and converting a resistance variation of the resistance wire into a pressure value. The pressure sensor is provided for varying the resistance value thereof according to an external pressure variation, wherein the resistance variation is processed and transmitted to the pressure setting module via the resistance wire. The electronic apparatus implements an application or function according to a pressure value of the pressure setting module. An electronic apparatus is also provided for implementing different applications by pressing the electronic apparatus and for setting numbers or pages when an application of music-playing or document-reading is locked.

12 Claims, 4 Drawing Sheets

PRESSURE ENABLING DEVICE AND METHOD AND ELECTRONIC APPARATUS CONTAINING THE SAME

RELATED APPLICATIONS

This application claims priority to China Application Serial Number 200910186503.1, filed Nov. 18, 2009, which is herein incorporated by reference.

FIELD OF INVENTION

The present invention relates to a pressure enabling apparatus, and more particularly, relates to an electronic apparatus involving a pressure enabling apparatus.

BACKGROUND ART

Currently, some digital devices combine with a G-sensor (accelerometer) inside to sense acceleration changes. When a digital device is speeding up, the G-sensor converts a moving change such as shaking, falling, ascending, descending into an electrical signal, which will be calculated and analyzed by a microprocessor to accomplish intentional functions. For example, an MP3 device can change a currently playing song to a former or a later one according to a rocking direction by the user, or calculate the pace of the user when the MP3 device is in a pocket of the user. In addition, advanced notebook is generally equipped with a G-sensor for immediately protecting the hard disk thereof to avoid damages when sensing express acceleration (such as accidentally dropping). Since G-sensor is an intelligent gravity sensing system used in hard disk drives for detecting a current status, then in an event of unexpected falling, the hard disk can sense the acceleration and make the head thereof automatically reset and depart from its plate to avoid accidental impact on data transmitting process, which will interrupt normal data reading/writing operation.

On the other hand, G-sensor technology can also be applied in a mobile phone so that appropriate application software, such as gaming, video playing and camera can be implemented based on user actions via the G-sensor. Similar to Wi-Fi system, G-sensor is also a micro electromechanical system (MEMS: Micro Electromechanical System) in which micro-sensors, processors and signal processing and control circuits, interface circuits, communication and power are combined.

Nevertheless, a mobile phone within a built-in G-sensor has relatively single features in moving state, which bring inconvenience to the user for calling and reduce user experience sense. Furthermore, great damages definitely occur especially when the user's handheld apparatus falls into the water since there is rare protection imposed on handheld apparatus.

SUMMARY OF THE INVENTION

Therefore, for resolving the aforementioned shortcomings, the present invention provides a pressure enabling apparatus for enabling by pressure an application or function of an electronic apparatus.

According to an aspect of the present invention, a pressure enabling device includes a pressure sensor, a resistance wire and a pressure setting module. A resistance of the pressure sensor can be varied according to variation of a strain on the electronic apparatus. The resistance wire is connected between the pressure sensor and the electronic apparatus. The pressure setting module is used for setting a pressure value corresponding to a resistance variation of the resistance wire. In the pressure enabling device, a resistance variation of the pressure sensor is to be processed and then transmitted to the pressure setting module via the resistance wire, so that an application or function of the electronic apparatus can be realized according to the pressure value set by the pressure setting module.

In one embodiment, the pressure sensor is attached to an outer surface of the electronic apparatus by adhesive and is covered with a protective film.

In one embodiment, the pressure sensor includes a resistor strain gauge or a semiconductor strain gauge, wherein a resistance variation of the resistor strain gauge is substantially directly proportional to a strain variation, or a resistance variation of the semiconductor strain gauge is based on the semiconductor's resistivity variation which is substantially directly proportional to the strain variation.

For use with the pressure enabling device, the electronic apparatus may be a mobile phone, a personal digital assistant, an MP3 device, an MP4 device, or a portable digital device of another kind. Further, the application or function of the electronic apparatus which is a mobile phone may include playing a game, playing music, making or receiving a call, or reading a document file. In detail, the application or function of the electronic apparatus which is a mobile phone may concern making or receiving a call when the pressure value is set in a range of 0-10 psi, concern playing a game when the pressure value is set in a range of 10-20 psi, concern playing music when the pressure value is set in a range of 20-30 psi, and concern reading a document file when the pressure value is set in a range of 30-40 psi.

In one embodiment, the electronic apparatus may change its application or function when the resistance of the pressure sensor is varied according to variation of the strain on the electronic apparatus. Also in one embodiment, the resistance variation of the resistance wire is to be converted by the pressure setting module into the pressure value for setting the pressure value.

The present invention also provides an electronic apparatus including a shell, the aforementioned pressure enabling device and a control module. The pressure enabling apparatus further includes a pressure sensor, a resistance wire and a pressure setting module. A resistance of the pressure sensor can be varied according to variation of a strain on the electronic apparatus. The resistance wire is connected between the pressure sensor and the shell. The pressure setting module is used for setting a pressure value corresponding to a resistance variation of the resistance wire. In the pressure enabling apparatus, a resistance variation of the pressure sensor is to be amplified and then transmitted to the pressure setting module via the resistance wire. The control module is used for receiving the pressure value from the pressure setting module and realizing an application or function of the electronic apparatus according to the pressure value.

The electronic apparatus may be a mobile phone, a personal digital assistant, an MP3 device, an MP4 device, or a portable digital device of another kind. Further, the application or function of the electronic device may concern playing a game, playing music, making or receiving a call, or reading a document file. In detail, when the application or function of the electronic apparatus which is the mobile phone may concern making or receiving call when the pressure value is set in a range of 0-10 psi, concern playing a game when the pressure value is set in a range of 10-20 psi, concern playing music when the pressure value is set in a range of 20-30 psi, and concern reading a document file when the pressure value is set in a range of 30-40 psi.

In one embodiment, the pressure sensor is attached to the shell of the electronic device by adhesive and may be covered with a protective film.

The present invention also provides a method for enabling by pressure an application or function of an electronic apparatus, and the method comprises obtaining a pressure value corresponding to variation of a strain on a pressure sensor of the electronic apparatus; transmitting the pressure value to a processing unit of the electronic apparatus for processing the pressure value; and enabling the application or function of the electronic apparatus according to a result of processing the pressure value by the processing unit.

In one embodiment, the pressure sensor is attached to an outer surface of the electronic apparatus by adhesive. In one embodiment, the processing unit comprises an A/D converter circuit or an amplifier.

Also in one embodiment, the pressure sensor comprises a resistor strain gauge or a semiconductor strain gauge.

The electronic device on which this method can be performed may be a mobile phone, a personal digital assistant, an MP3 device, an MP4 device, or a portable digital device of another kind.

In one embodiment, the electronic device may change the application or function between playing a game, playing music, making or receiving a call, and reading a document file, when the pressure sensor is pressed.

BRIEF DESCRIPTION OF THE DRAWINGS

These and other features of the invention will become more apparent from the following description, in which reference is made to the appended drawings, wherein.

PREFERRED EMBODIMENTS OF THE INVENTION

Figure 1:
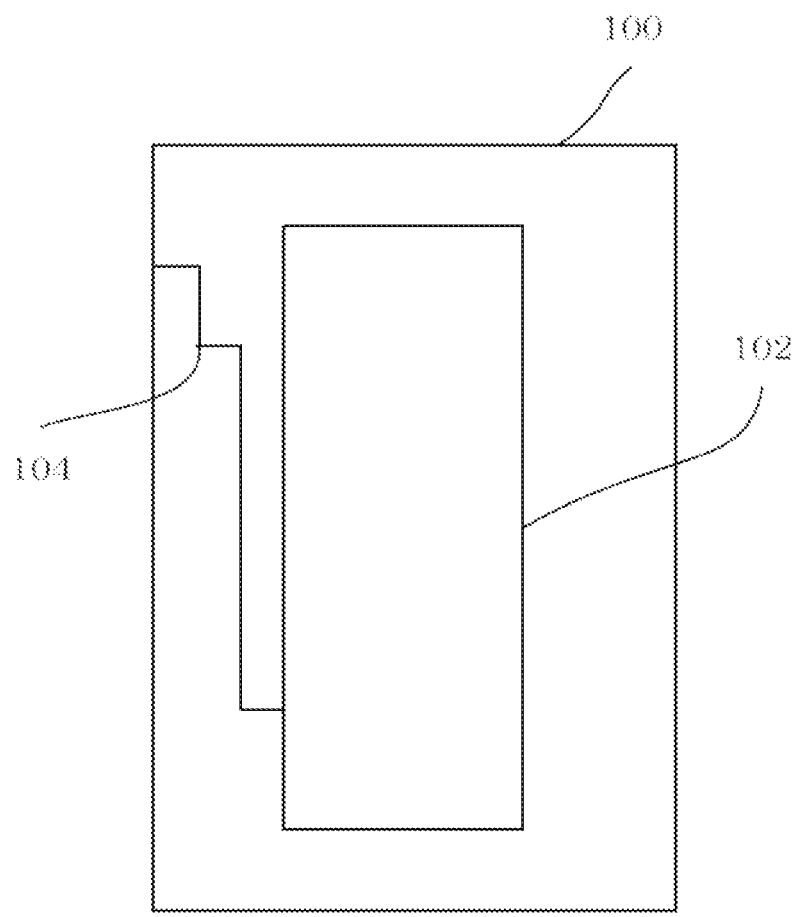
FIG. 1 is a schematic diagram showing the structure of a pressure enabling apparatus according to an exemplary embodiment of the present invention.

One or more embodiments have been described in details with the accompanying drawings. It will be apparent to one of ordinary skill in the art that a number of variations and modifications can be made without departing from the scope of the invention as defined in the claims.

Firstly, a piezoresistance transducer and a piezoresistive effect are briefly introduced. The piezoresistance transducer is formed from diffused resistors disposed on a substrate of semiconductor material in accordance with the piezoresistive effect, wherein the substrate can be directly used as a sensor component element for measurement, in which the diffused resistors form are coupled into a bridge. When no external force is exerted on the substrate, the bridge is under a balance state and the output violate is a zero bridge circuit which is in balance with a zero output voltage if there is not external pressure on the substrate. When the substrate is distorted deformed by an external force under an external pressure, the respective resistances in the bridge will be changed, and thus the bridge will be changed from the balance state to an unbalance state and a corresponding voltage is generated therefrom. Generally, the piezoresistance transducer is used for measuring and controlling a physical quantity (such as liquid level, accelerated velocity, weight, strain, flow rate or vacuum level) which is converted from a force variation such as pressure difference, pulling force difference. A silicon or germanium substrate is mainly used as the substrate of the piezoresistance transducer, wherein the application of a solid-state piezoresistance transducer formed from silicon material is the most popular. Secondly, As to the piezoresistive effect, using single-crystal silicon material as an example for explanation, when an external force is exerted on a silicon crystal, the crystal lattice thereof is deformed, thus causing the carriers thereof to be scattered from one energy valley to another energy valley, resulting in the change of carrier mobility which disturbs the average amounts of carriers in the lateral and longitudinal directions for changing silicon resistivity, an electronic signal output in direct proportion to the external force change can be obtained via a circuit measurement.

A person of ordinary skill in the art should understand that the carrier mobility variation is different with different crystal orientations, and accordingly, the piezoresistive effect of silicon is related to the crystal orientation. In addition, the piezoresistive effect of silicon is different from the principle of a strain gauge (i.e. resistor strain gauge), since a voltage variation in the piezoresistive effect of silicon is mainly determined by the silicon resistivity variation, but a voltage variation in the strain gauge is determined by the geometric size change of the silicon material itself, wherein the sensitivity of the piezoresistive effect are 50-100 times larger than that of strain gauge. Accordingly, the pressure enabling apparatus adopting the piezoresistance transducer can obtain higher sensitivity.

In a piezoresistive strain sensor, a resistance wire is a sensor component used for converting a strain change exerted on a tested object to an electronic signal. The resistance wire is one of the main components of the piezoresistive strain sensor. A metal strain wire and a semiconductor strain wires are two most commonly used species for the resistance wire. There are two species for metal resistance wire, which are a filament wire and a metal foil wire. Generally, the wire is tightly attached to a substrate on which mechanical strain occurs by using a special adhesive, thereby forming a strain gauge. When the substrate is strained by an external force, the resistance wire is also deformed, so that the resistance of the strain gauge is changed, thus changing the voltage applied on the resistor. Such a strain gauge generates a relative small resistance change when being applied with an external force, and thus needs to be formed as a strain bridge, and the signal generated from the strain bridge has to be magnified by a subsequent amplifier circuit and then are transmitted to a processing unit (generally includes an A/D convertor circuit and a CPU).

The working principle of a metal resistance strain gauge is based on a phenomenon that a resistance of a wire attached on a substrate is changed in accordance with mechanical deformation of the substrate, which is referred to as a resistance strain effect. A resistance of a metal conduct can be expressed by the following equations:

$$R = \rho S/L \tag{1}$$

wherein: $\rho$—metal conductor resistivity ($\Omega \cdot cm^2/m$)
S—conductor cross-sectional area ($cm^2$)
L—conductor length (m)

Using a metal wire strain resistor as an example for explanation, when an external is exerted on a metal wire, the length and cross-sectional area of the metal wire will be changed, and thus it can be easily known from equation (1) that, the resistance thereof will be changed accordingly. If the metal wire is stretched by the external force, its length will increase and its cross-sectional area will decrease, and thus the resistance will increase. If the metal wire is compressed by the external force, its length will decrease and its cross-sectional area will increase, and thus the resistance will decrease. Hence, as long as the resistance change can be measured, the strain change of the metal wire can be obtained promptly.

FIG. 1 is a schematic diagram showing the structure of a pressure enabling device according to an exemplary embodiment of the present invention, wherein a mobile phone within the pressure enabling device is illustrated. One of ordinary skill in the art should understand that the mobile phone is merely used as an example for explanation, and embodiments of the present invention are not limited thereto. In other embodiments, the pressure enabling device is also applicable to an electronic apparatus such as a personal digital assistant (PDA), an MP3 device, an MP4 device, or any other multi-function portable digital device.

As shown in FIG. 1, the pressure enabling apparatus includes: a pressure sensor 100, a pressure setting module (not shown) and a resistance wire 104. The pressure sensor 100 can be a resistor strain gauge or a semiconductor strain gauge, wherein an electronic apparatus (such as a mobile phone) resistance variation of the resistor strain gauge is substantially directly proportional to a strain variation exerted on a shell 102 of, or a resistance variation of the semiconductor strain gauge is based on the semiconductor's resistivity variation which is substantially directly proportional to the strain variation. Herein, the resistor strain gauge is used as an example for explanation. The resistor strain gauge (pressure sensor 100) can be tightly attached to the shell 102 of an electronic apparatus by adhesive and can be covered with a protective film (not shown), and is used to convert a strain change exerted on the shell 102 into an electron signal. Thus, when the strain change occurs due to an external force exerted on the shell 102, the resistor strain gauge will also be deformed accordingly, thereby changing the resistance of the resistor strain gauge and also the voltage applied on the resistor.

It is understood that the resistance variation of the resistor strain gauge is relatively small when an external force is exerted on the resistor strain gauge, so that it is generally required to couple several resistor strain gauges into a strain bridge (referring to FIG. 2), and an output voltage of the strain bridge needs to be amplified by an amplifier and transmitted to a processing unit (such as A/D converter or CPU). In an exemplary embodiment of the present invention, the resistance wire 104 is provided for amplifying a resistance variation of the resistor strain gauge, and then transmitting the amplified resistance variation to a control module (not shown) of the mobile phone. The control module can be a pressure setting module, but is not limited thereto, for enabling a corresponding application of the mobile phone according to a pressure value corresponding to the output voltage of the electrical bridge, and the control module may.

Figure 2:
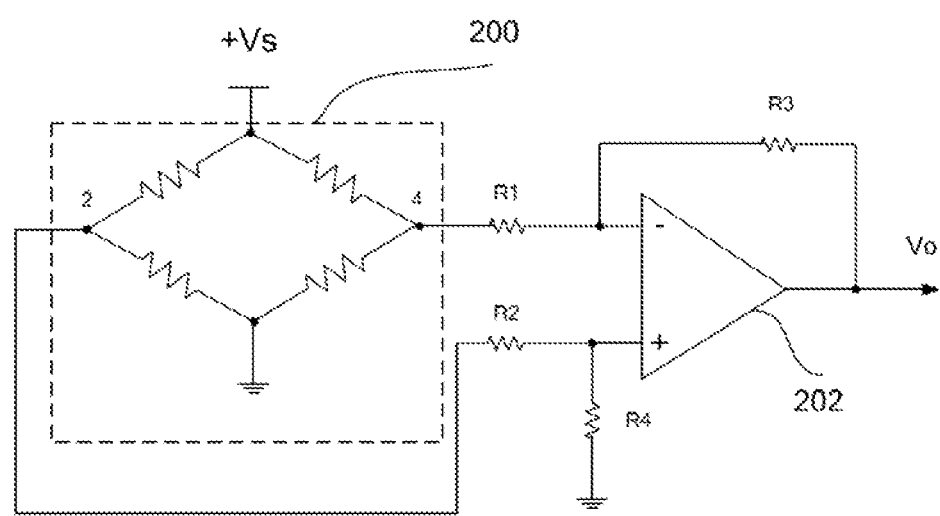
FIG. 2 is a schematic diagram showing an amplifier circuit for amplifying a voltage variation according to an exemplary embodiment of the present invention.

FIG. 2 is schematic diagram showing an amplifier circuit of the pressure enabling apparatus shown in FIG. 1. In this embodiment, $V_2$ and $V_4$ represent a voltage of Node 2 and a voltage of Node 4 on a strain bridge 200 respectively, and $V_O$ represents an output voltage of the strain bridge 200. It is noted that, according to the load balancing principle at the input ends of the amplifier circuit, resistances $R_1$, $R_2$, $R_3$ and $R_4$ are required to satisfy the relationship: $R_3/R_1=R_4/R_2$.

To reflect a ratio relationship between the output voltage $V_O$ and a voltage variation ($V_2-V_4$) between Node 2 and Node 4 on the strain bridge 200, a brief derivation is explained in the below:

Assume that $V_+$ represents a voltage at a positive input end of the amplifier 202, and $V_-$ represents a voltage at a negative input end of the amplifier 202, and it is can be known from Kirchhoff's law that:

$$(V_4-V_+)/R1=(V_+-V_O)/R_3 \quad (2)$$

$$V_2/(R_2+R_4)=V_-/R_4 \quad (3)$$

Due to the virtual short function between the positive input end and the negative input end, i.e. $V_+=V_-$, based on the aforementioned equations (2) and (3), the following equation can be obtained.

$$V_O=(V_2-V_4)R_3/R_1 \quad (4)$$

By choosing an appropriate ratio of $R_3$ to $R_1$, a small voltage variation in the bridge 200 can be converted into a voltage variation within a corresponding range.

Figure 3:
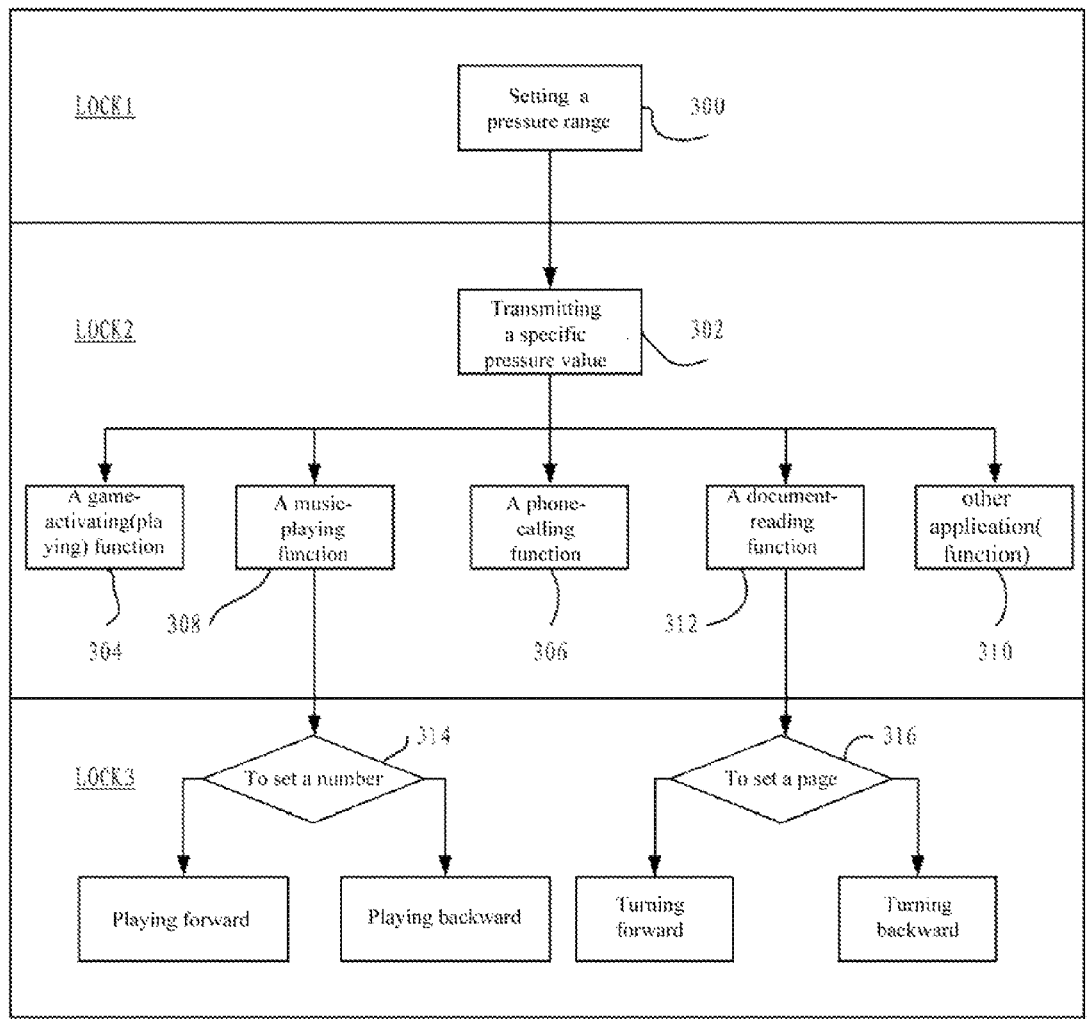
FIG. 3 is a functional diagram of a pressure enabling device under different pressure values.

FIG. 3 illustrates a functional diagram of a pressure enabling apparatus under different pressure values. It should be understood by one of ordinary skill in the art of the invention that, the functional diagram of FIG. 3 is only an exemplary embodiment in the present invention. As described in the above, the strain (stress) variation on the electronic apparatus is corresponding to the resistance variation of the pressure sensor 100. Then, the amplified resistance variation of the resistance wire 104 is processed by the processing unit (such as an A/D converter). At this point, the voltage value in an analog form will be converted into the pressure value in a digital form. Further, if the digital range of the A/D converter is from 0 to 255 (also referred to as a first A/D), then the pressure value corresponding to a respective application or function of the electronic apparatus may fall within any interval of this range (such as 0-10, 10-20, or 20-30 psi). Certainly, if the digital range of the A/D converter is from 0 to 64 (also referred to as a second A/D), then the pressure value corresponding to a respective application or function may fall within any interval of this range. Unlike to the first A/D having the conversion range of 0-255, the same digital pressure value outputted by the second A/D may perform a different application or function. In other words, when the pressure value falls within the range of 20-30 psi, the electronic apparatus may perform playing a game (a game-playing function) if the A/D converter is the first A/D, while the electronic apparatus may perform playing music (a music-playing function) if the A/D converter is the second A/D. From this point of view, the ranges for the pressure value described hereinafter are merely used to distinguish one application (or function) from another application (or function), and one of ordinary skill in the art does not need to determine the exact strain variation and the exact pressure value for enabling the embodiments of the present invention.

Referring to FIG. 3, step 300 is performed for setting a pressure range and accessing a subsequent step when a pressure value corresponding to a voltage value falls within the pressure range. Meanwhile, it is necessary to set a lock1 flag for locking the application or function, so that a user may load a lock1 flag when needing to use the pressure enabling device, and may release the lock 1 flag when not needing to use the pressure enabling device. In other words, the step of setting the pressure range via the pressure enabling apparatus can be considered as a lock1 layer.

Step 302 is performed for transmitting a specific pressure value to perform step 304, step 306, step 308, step 310 or step 312 in accordance with a predetermined pressure range thereof. Meanwhile, another flag can be set to latch respective applications (functions) based on different pressure values, such as staring game (a game-activating (playing) function) in step 304, calling (a phone-calling function) in step 306, playing music (a music-playing function) in step 308, another application (function) in step 310 and reading a document file (a document-reading function) in step 312. A lock2 flag is loaded when the user needs to select the aforementioned applications (functions), while the lock2 flag is released when the user does not to select the aforementioned applications (functions). In other words, the selecting of the aforementioned applications (functions) can be considered as a lock2 layer, and the pressure value variation, corresponding to the application of step 304, step 306, step 308 or step 312, is only valid in the lock2 layer.

In step 304, the mobile phone performs the game-playing function when the pressure value falls within the range of 10-20 psi.

In step 306, the mobile phone performs the phone-calling function when the pressure value falls within the range of 0-10 psi.

In step 308, the mobile phone performs the music-playing function when the pressure value falls within the range of 20-30 psi.

In step 312, the mobile phone performs the document-reading function when the pressure value falls within the range of 30-40 psi, wherein the document can be, but not limited to, a word format or PDF format document.

In step 310, the mobile phone performs another application (function) when the pressure value falls within another range.

In addition, when the mobile phone is playing music or reading a document (file), a lock3 flag may be loaded and used for setting a music item list for the music-playing function and a page number for the document-reading function, thereby entering a lock3 layer. Concretely speaking, when step 308 is performed, the mobile phone starts playing music, and the pressure value is applied for setting the music item list. Meanwhile, for example, the previous one or next one music item is played when the pressure value is within 0-10 psi; the music item before the previous one or after the next one is played when the pressure value is within 10-20 psi; and on the like. When it is required to exit from the lock3 layer, the lock3 flag is released to return to the lock2 layer, and the pressure value is now provided for selecting an application in lock2 layer. Similarly, when step 312 is performed, the mobile phone starts reading a document file, and the pressure value is applied for flipping pages in step 316. For example, the mobile phone flips one page forward or backward when the pressure is 0-10; the mobile phone flips two pages forward or backward when the pressure is 10-20; and on the like. When it is required to exit from the lock3 layer, the lock3 flag is released to return to the lock2 layer, and the pressure value is now provided for selecting an application in lock2 layer.

It can be seen from steps 314 and 316 that the pressure range for the pressure value can be used for playing the previous or next music items or flipping the pages of the document forward or backward when the lock3 layer is accessed, instead of selecting applications in the lock2 layer. In other words, the applications in the lock3 layer include two operations, i.e. playing the previous or next music items; and flipping the pages of the document forward or backward.

The above description has explained an exemplary embodiment of the pressure enabling apparatus shown in the present invention. Hereinafter, detailed execution steps are provided for explaining a pressure enabling method of the present invention.

Figure 4:
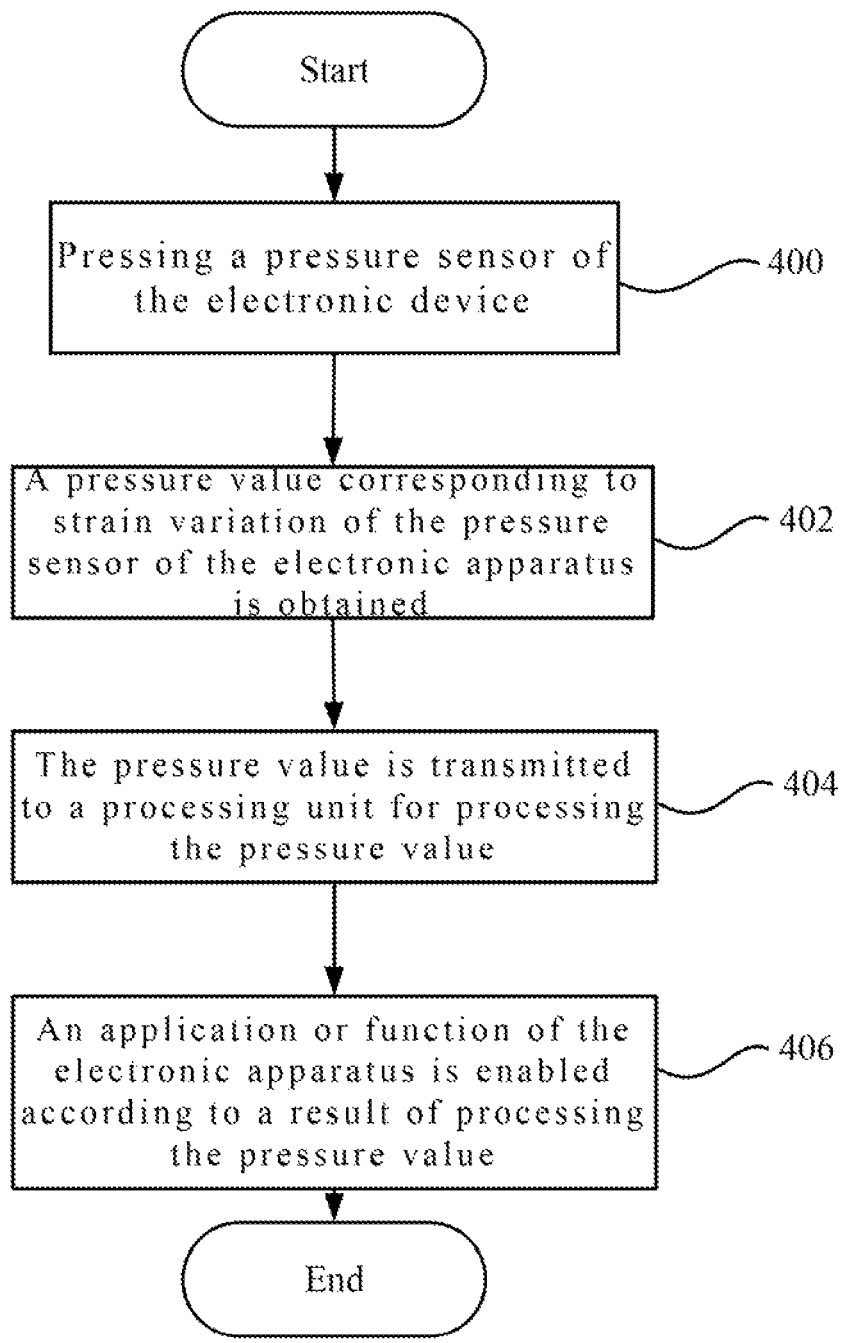
FIG. 4 is a flow chart of a pressure enabling method according to an exemplary embodiment of the present invention.

FIG. 4 is a flow chart of a pressure enabling method according to an exemplary embodiment of the present invention. Referring to FIG. 4, in step 400, a pressure sensor responds to a pressure (stress) variation when a user presses a pressure sensor of the electronic apparatus. Then, in steps 402 and 404, a pressure value corresponding to strain variation of the pressure sensor of the electronic apparatus is obtained and transmitted to a processing unit for processing the pressure value. For example, in one embodiment, the pressure value is generally small and needs to be converted by the processing unit, such as an A/D conversion circuit or be amplified by an amplifier. Then, in step 406, an application or function of the electronic apparatus is enabled according to a result of processing the pressure value by the processing unit. Preferably, the applications or functions include a game-playing function, a music-playing function, a phone-calling function and a document-reading function. Therefore, the electronic apparatus such as a mobile phone) having the pressure enabling apparatus can freely perform any one the aforementioned application or functions by pressing one side of the electronic apparatus. Moreover, when an application (function) such as the music-playing function or the document-reading function is selected and locked, the pressure variation exerted on the pressure sensor attached to the electronic apparatus also can be used to set a music item to be played or flip a page forward or backward. Besides, the electronic apparatus (mobile phone) also can be used to measure pressure under the sea.

The person of ordinary skill in the art should understand that the electronic apparatuses of the exemplary embodiment of the present invention can be portable handheld apparatus as well as another electronic apparatus compatible with the pressure enabling apparatus, which can enable the apparatus to implement different applications or performing different functions by detecting a user's pressure (stress) value and responding sequence.

Moreover, according to a further embodiment of the present invention, a portable electronic apparatus can automatically float up when falling into water. Firstly, the electronic apparatus can monitor an external pressure exerted thereon according to the pressure formula, and can be changed off automatically according to the pressure, and then can increase its buoyancy by increasing displaced water volume based on the buoyancy formula. Therefore, the electronic apparatus can automatically emerge from water when the buoyancy is greater than or equal to the gravity.

The embodiment and related configurations were chosen and described in order to explain the principles of the present invention and their practical application so as to enable others of ordinary skill in the art to utilize the invention and various embodiments and with various modifications as are suited to the particular use contemplated. Alternative embodiments will become apparent to those of ordinary skill in the art to which the present invention pertains without departing from its spirit and scope. Accordingly, the scope of the present invention is defined by the appended claims rather than the foregoing description and the exemplary embodiment described therein.

What is claimed is:

1. A pressure enabling device for enabling by pressure an application or function of an electronic apparatus, comprising:
   a pressure sensor disposed on the electronic apparatus, wherein resistance of the pressure sensor can be varied according to variation of a strain on the electronic apparatus;
   a resistance wire connected between the pressure sensor and the electronic apparatus; and a pressure setting module for setting a pressure value corresponding to a resistance variation of the resistance wire;

wherein a resistance variation of the pressure sensor is to be processed through the resistance wire, so that an application or function of the electronic apparatus can be realized according to the pressure value set by the pressure setting module.

2. The pressure enabling device of claim 1, wherein the electronic apparatus is a mobile phone, a personal digital assistant, an MP3 device, an MP4 device, or a portable digital device of another kind.

3. The pressure enabling device of claim 2, wherein the application or function of the electronic apparatus which is the mobile phone concerns playing a game, playing music, making or receiving a call, or reading a document file.

4. The pressure enabling device of claim 3, wherein the application or function of the electronic apparatus which is the mobile phone concerns making or receiving a call when the pressure value is set in a range of 0-10 psi, concerns playing a game when the pressure value is set in a range of 10-20 psi, concerns playing music when the pressure value is set in a range of 20-30 psi, and concerns reading a document file when the pressure value is set in a range of 30-40 psi.

5. The pressure enabling device of claim 1, wherein the resistance variation of the pressure sensor is to be amplified by the resistance wire, so that an application or function of the electronic apparatus can be realized according to the pressure value set by the pressure setting module.

6. An electronic apparatus, comprising:
a shell;
a pressure enabling device, comprising:
a pressure sensor disposed on the electronic apparatus, wherein resistance of the pressure sensor can be varied according to variation of a strain on the electronic apparatus;
a resistance wire connected between the pressure ensor and the shell: and
a pressure setting module for setting a pressure value corresponding to a resistance variation of the resistance wire; and a control module for receiving the pressure value from the pressure setting module and realizing an application or function of the electronic apparatus, wherein a resistance varation of the pressure sensor is to be processed through the resistance wire, so that application or function of the electronic apparatus can be realized according to the pressure value.

7. The electronic apparatus of claim 6, wherein the electronic apparatus is a mobile phone, a personal digital assistant, an MP3 device, an MP4 device, or a portable digital device of another kind.

8. The electronic apparatus of claim 7, wherein the application or function of the electronic apparatus concerns playing a game, playing music, making or receiving a call, or reading a document file.

9. The electronic apparatus of claim 8, wherein the application or function of the electronic apparatus which is the mobile phone concerns making or receiving a call when the pressure value is set in a range of 0-10 psi, concerns playing a game when the pressure value is set in a range of 10-20psi, concerns playing music when the pressure value is set in a range of 20-30 psi, and concerns reading a document file when the pressure value is set in a range of 30-40 psi.

10. The electronic apparatus of claim 6, wherein the resistance variation of the pressure sensor is to be amplified by the resistance wire, so that the application or function of the electronic apparatus can be realized according to the pressure value.

11. A method for enabling by pressure a function of an electronic apparatus, comprising:
obtaining a pressure value according to variation of a strain on a pressure sensor on the electronic apparatus;
transmitting the pressure value to a processing unit of the electronic apparatus to determine a pressure value range the pressure value is in; and
enabling the function of the electronic apparatus according to the pressure value range.

12. The method of claim 11, wherein the electronic apparatus is a mobile phone, a personal digital assistant, an MP3 device, an MP4 device, or a portable digital device of another kind.

* * * * *